United States Patent [19]

Chang

[11] Patent Number: 5,271,688

[45] Date of Patent: Dec. 21, 1993

[54] JOINT FOR MAGIC SQUARE CENTRAL BEARING STRUCTURE

[75] Inventor: Hank Chang, Taipei, Taiwan

[73] Assignee: Famwealth International Inc., Taipei, Taiwan

[21] Appl. No.: 936,508

[22] Filed: Aug. 28, 1992

[51] Int. Cl.⁵ ............................................. F16B 2/04
[52] U.S. Cl. ................................. 403/290; 403/248; 273/153 S; 411/339
[58] Field of Search ............... 403/289, 277, 248–250, 403/297, 217–219, 290; 273/153 S, 153 R; 411/338, 339, 508, 913, 271

[56] References Cited

U.S. PATENT DOCUMENTS

| | | | |
|---|---|---|---|
| 4,012,155 | 3/1977 | Morris | 403/290 |
| 4,151,974 | 5/1979 | Kuhn | 403/290 X |
| 4,427,197 | 1/1984 | Doose | 273/153 S |
| 4,540,177 | 9/1985 | Horvath | 273/153 S |
| 4,657,255 | 4/1987 | Seres | 273/153 S X |
| 4,817,952 | 4/1989 | Biró et al. | 273/153 S |
| 4,881,843 | 11/1989 | Randleman | 403/297 X |
| 5,143,500 | 9/1992 | Schuring et al. | 411/339 |

FOREIGN PATENT DOCUMENTS

| | | | |
|---|---|---|---|
| 154193 | 3/1982 | Fed. Rep. of Germany | 273/153 S |
| 170062 | 12/1977 | Hungary | 273/153 S |
| 1247028 | 7/1986 | U.S.S.R. | 273/153 S |
| 1340782 | 9/1987 | U.S.S.R. | 273/153 S |
| 1347959 | 10/1987 | U.S.S.R. | 273/135 S |
| 2111840 | 7/1983 | United Kingdom | 273/153 S |

Primary Examiner—Randolph A. Reese
Assistant Examiner—Harry C. Kim
Attorney, Agent, or Firm—Ezra Sutton

[57] ABSTRACT

A magic square comprised of a central bearing having six joint axles respectively associated with six central surface segments rotatably secured thereon, twenty edge surface segments being fit in the space formed by the central surface segments to form a three-dimensional square block. Each of the central surface segments comprises a through hole having an inside diameter larger than the joint axle to be rotatably fit on the joint axle. Each of the joint axles has an expanded end with a cone-shaped camming surface, the expanded end defining a step with the joint axle. A pair of diametrical slits in the form of a cross are formed on the expanded end to provide a resilient inward deformation when the expanded end is contacted by the through hole of the central surface segment to allow the expanded end to penetrate and pass the through hole and then expand back to its original shape to have the step abut against the peripheral edge of the through hole and thus retaining the central surface segment on the joint axle.

3 Claims, 2 Drawing Sheets

JOINT FOR MAGIC SQUARE CENTRAL BEARING STRUCTURE

FIELD OF THE INVENTION

The present invention relates generally to a magic square and in particular to the joints for connecting surface segments to the central bearing thereof.

BACKGROUND OF THE INVENTION

A magic square is generally comprised of a central bearing with six central surface segments rotatably secured thereon. Twenty edge surface segments are then fit into the space formed by the central surface segments to form a three-dimensional square block. Conventionally the joints between the central surface segments and the central bearing structure are done with screws. The screws secure the body of each central surface segment to the central bearing. A lid plate, generally with one side colored, is then mounted on the central surface segment body to provide a colorful surface configuration for the magic square.

A disadvantage of the conventional joints for connecting the central surface segments to the central bearing is that since the assembly of the magic square is done with screws, a great amount of time and labor are required in completing the manufacturing of a magic square. Further, such a screw joint is also not a design for a player of the square magic to assemble the magic square by oneself.

It is therefore desirable to provide a magic square which has a joint structure to connect the central surface segments to the central bearing without screws and thus can be assembled without hand tools.

OBJECTS OF THE INVENTION

A primary object of the present invention is therefore to provide a magic square which has a joint structure to connect the central surface segments to the central bearing without screws to enhance the manufacturing of the magic square.

It is another object of the present invention to provide a magic square which has snap-on type joints to connect the central surface segments to the central bearing so that no screws are required and thus the manufacturing of the magic square is enhanced.

It is a further object of the present invention to provide a magic square which has a joint structure to connect the central surface segments to the central bearing without the need of hand tools so as to provide a user-assembly magic square.

To achieve the above-mentioned object, there is provided a magic square comprised of a central bearing having six joint axles respectively associated with six central surface segments rotatably secured thereon, twenty edge surface segments being fit in the space formed by the central surface segments to form a three-dimensional square block. Each of the central surface segments comprises a through hole having an inside diameter larger than the joint axle to be rotatably fit on the joint axle. Each of the joint axles has an expanded end with a cone-shaped camming surface, the expanded end defining a step with the joint axle. A pair of diametrical slits in the form of a cross are formed on the expanded end to provide a resilient inward deformation when the expanded end is contacted by the through hole of the central surface segment to allow the expanded end to penetrate and pass the through hole and then expand back to its original shape to have the step abut against the peripheral edge of the through hole and thus retaining the central surface segment on the joint axle.

Other objects and advantages of the invention will be apparent from the following description of a preferred embodiment taken in connection with drawings, in which:

DETAILED DESCRIPTION OF THE PREFERRED EMBODIMENT

Figure 1:
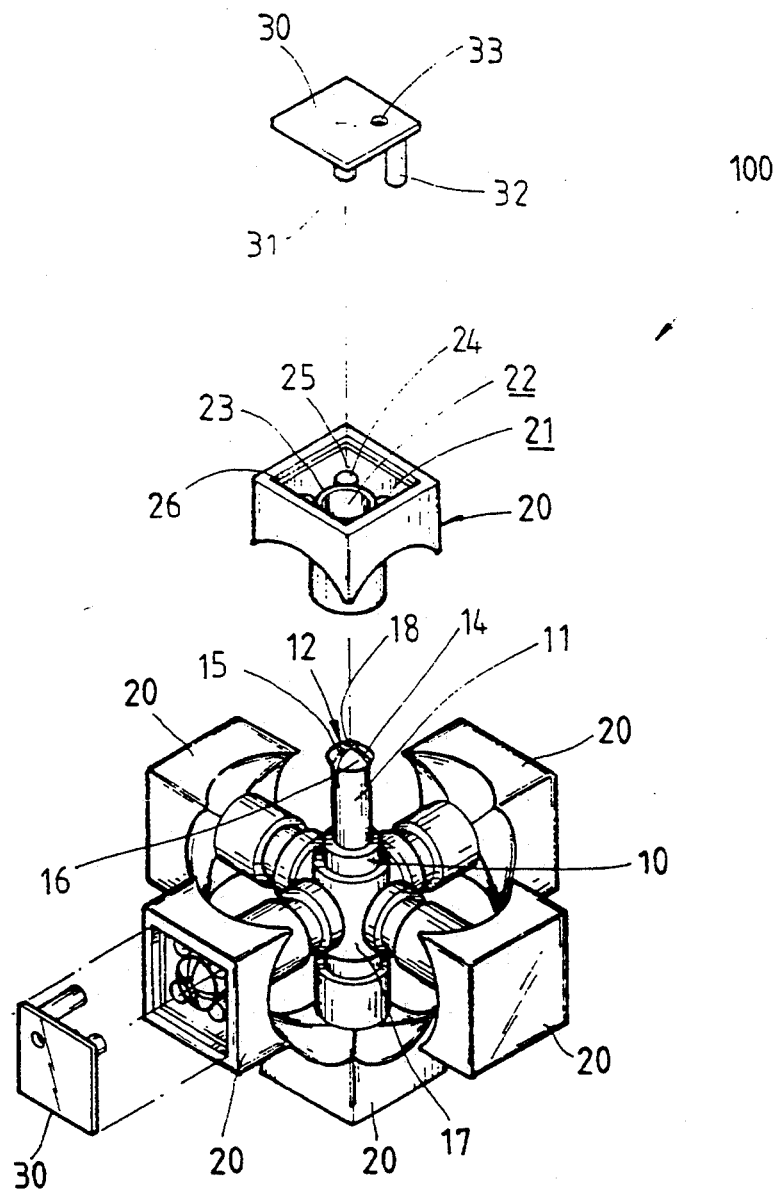
FIG. 1 is an exploded fragmentary view of a magic square in accordance with the present invention, the edge surface segments being removed to more clearly illustrate the connection between the central surface segments and the central bearing.

Referring to the drawings and in particular to FIG. 1, wherein a magic square 100 is shown. The magic square 100 is comprised of a central bearing 10 with six central surface segments 20 disengageably secured thereon with the edge surface segments removed from the drawings to more clearly show the central bearing structure made in accordance with the present invention. Although the edge surface segments of the magic block 100 are not shown on the drawings, it is apparent to those skilled in the art to imagine the actual positions where these edge surface segments are to be mounted on the magic square 100 and how to install these edge surface segments. The detail regarding the edge surface segments is not the concern of the present invention and thus will not be further discussed herein.

Figure 2:
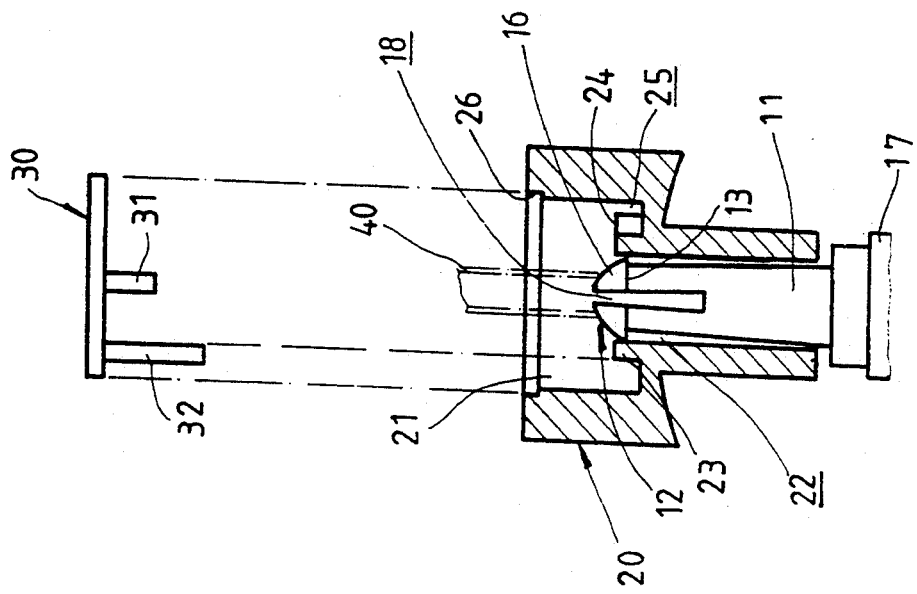
FIG. 2 is a cross-sectional view showing the engaging process of a central surface segment connecting to a joint axle of the central bearing.
Figure 3:
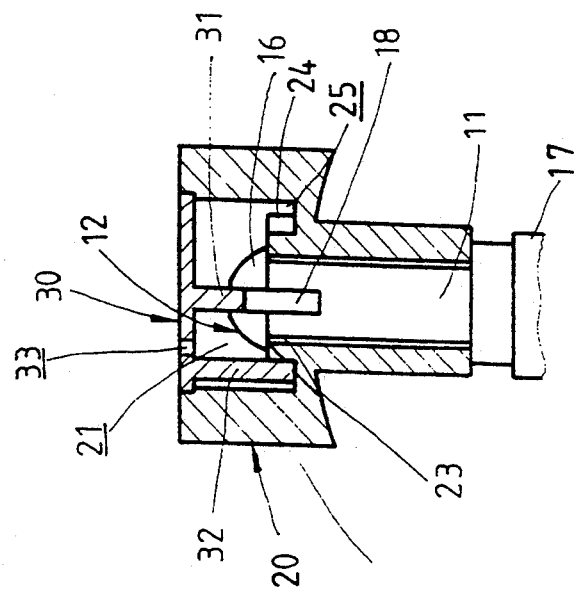
FIG. 3 is a cross-sectional view showing the situation when the central surface segment has engaged on the joint axle of the central bearing.

The central bearing 10 comprises six joint axles 11 extending along three mutually perpendicular directions in pair, each of which is associated with one of the central surface segments 20, in the form of a cylinder with a first end thereof integrally secured together to form a joint base 17 and a second end having an expanded joint member 12 formed thereon. The joint axles 11 and the expanded joint members 12 thereof are preferably made of a material with resilience. The construction of the joint axles 11 and the expanded joint members 12 are best seen in FIGS. 2 and 3. Each of the expanded joint members 12 has a base with a diameter larger than the cylindrical joint axle 11 associated therewith to form a step 13 therebetween, serving as a retaining means to be discussed in more detail hereinafter.

A plurality of diametrical slits are formed on each of the joint members 12 with an intersection hole thereof substantially on the central axis of the joint axle 11. In the embodiment shown in the drawings, there are two such slits 14 and 15 substantially normal to each other with an intersection hole 18, forming a cruciform groove on the joint member 12. The purpose of the diametrical slits 14 and 15 is to provide the second end of each of the joint axles 11 with more resilience so as to form a snap-on type engagement with the central surface segments 20 associated therewith.

Each of the central surface segments 20 has a recess 21 with a hole 22 formed therein and extending through one side thereof. The hole 22 has an inside diameter slightly larger than the diameter of the joint axles 11 to allow the associated joint axle 11 to be slidably fit thereon and rotatable with respect thereto. The diameter of the hole 22, however, is smaller than the base of the associated expanded joint member 12 so that when the hole 22 is forcibly fit on the expanded joint member 12, the inside diameter of the hole 22 resiliently inward deforms the expanded joint member 12 to thin the joint member 12 and thus allowing the joint member 12 to penetrate into the hole 12 and finally passing the hole 22 and entering the recess 21. When the joint member 12 enters the recess 21 of the central surface segment 20, the constraint imposed thereupon by the inside diameter of the hole 22 no longer exists and the joint member 12 restores to its original shape with the step 13 abutting against a circular shoulder 23 formed around the hole 22 inside the recess 21.

To assist the insertion of the expanded joint member 12 into the hole 22 of the central surface segment 20, the expanded joint member 12 preferably comprises a plurality of camming surfaces 16 formed thereon and convergent toward the tip thereof to substantially form a cone shape so that when the camming surfaces 16 are contacted by the hole 22 of the central surface segments 20, an inward component of the contacting force is generated to deform the expanded joint member in an inward direction.

A lid plate member 30 is used to cover the recess 21 formed on each of the central surface segments 20. The lid plate member 30 has a plurality of rod-like members, including a central rod 31 and at least a side rod 32, depending therefrom. The central rod 31 is so sized and located that when the lid plate 30 covers the recess 21, the central rod 31 is forcibly inserted into the intersection hole 18 of the diametrical slits 14 and 15 and thus frictionally engaged thereby. The side rod 32 is preferably resilient and is so located that when the lid plate 30 covers the recess 22, part of the side rod 32 enters a gap 25 between an inner side wall of the recess 21 and the circular shoulder 23 to be frictionally engaged by at least the circular shoulder 23 so as to keep the lid plate member 30 stick to the central surface segments 20.

It is also possible to provide frictional engaging members 24 around the circular shoulder 23 to provide a gap 25 of a more suitable size with the inner side wall of the recess 21 so as to make it easy to secure the lid plate member 30 on the recess 21.

A peripheral shoulder 26 may be formed on the recess 21 to further provide a support to the lid plate member 30.

To open the lid plate 30, an aperture 33 is provided on the lid plate 30 to allow a rigid slender member (not shown) to insert and then removing the lid plate 30 from the recess 21 by prying. Once the lid plate 30 is removed, a tubular member 40 (see FIG. 2 in phantom line) is used to forcibly deform the expanded joint member 12 inward by contacting and forcibly pressing the camming surfaces 16 of the expanded joint member 12 to disassemble the central surface segment 20 from the associated joint axle 11.

It is apparent that although the invention has been described in connection with a preferred embodiment, those skilled in the art may make changes to certain features of the preferred embodiment without departing from the spirit and scope of the invention as defined in the appended claims.

What is claimed is:

1. A central bearing for a magic square wherein said magic square comprises the central bearing having six joint axles extending from a bearing base thereof along three substantially mutually perpendicular directions in pair, each of said joint axles having a remote end with a central surface segment disengageably secured thereon in such a way as to be rotatable with respect to a center axis of said joint axle, spaces being defined between said central surface segments into which a plurality of edge surface segments are disengageably fit to form a three-dimensional square block, the improvements comprising: each of said central surface segments having a through hole formed thereon with an inside diameter larger than a diameter of said joint axle to allow said central surface segments to be rotatably fit on said joint axle, each of said joint axles having an expanded end member formed at the remote end thereof, said expanded end member having a base with a diameter larger than the inside diameter of the through hole formed on said central surface segment, defining a step between said remote end and said expanded end member, said expanded end member being in the form of a cone with a plurality of diametrical slits formed thereon and intersecting at an intersection hole, said cone serving as a camming means and said diametrical slits serving as a resilient means so that when the inside diameter of said through hole contacts and presses said conical expanded end member, said cone undergoes an inward resilient deformation to compress the base of said expanded end member and thus allowing said expanded end member to enter and pass said through hole, said expanded end member expanding back to its original shape after protruding out of said through hole to have said step abut at a circular shoulder defined by said through hole to retain said central surface segment on said joint axle, each of said central surface segments further includes a recess with said through hole formed therein, said recess defining a peripheral step to support a lid plate member to cover said recess and said expanded end member protruding out of said through hole and thus entering said recess, a central rod being so secured to said lid plate member so that when said lid plate member is disposed on said peripheral step, said central rod being partially received in said intersection hole and frictionally engaged thereby, said recess having an inside surface defining a gap with said circular shoulder to frictionally engage a portion of at least a side rod depending from said lid plate member when said lid plate member is disposed on said recess.

2. A central bearing for a magic square as claimed in claim 1 wherein said lid plate member has an aperture formed thereon to allow a slender tool to pass for disassembling said lid plate member from said recess by prying.

3. A central bearing for a magic square as claimed in claim 1 wherein said plurality of diametrical slits comprise two diametrical slits substantially normal to each other.

* * * * *